United States Patent [19]

Agnello

[11] 4,369,336

[45] Jan. 18, 1983

[54] METHOD AND APPARATUS FOR PRODUCING TWO COMPLEMENTARY PITCH SIGNALS WITHOUT GLITCH

[75] Inventor: Anthony Agnello, Brooklyn, N.Y.

[73] Assignee: Eventide Clockworks, Inc., New York, N.Y.

[21] Appl. No.: 226,598

[22] Filed: Jan. 21, 1981

Related U.S. Application Data

[63] Continuation-in-part of Ser. No. 97,266, Nov. 26, 1979, abandoned.

[51] Int. Cl.[3] .......... H04B 1/66

[52] U.S. Cl. .......... 179/1 J; 84/1.24; 179/15.55 T

[58] Field of Search .......... 179/1 J, 1 M, 1 SM, 179/15.55 R, 15.55 T, 1.5 H; 84/1.01, 1.24, 1.25; 360/36, 8; 375/23

[56] References Cited

U.S. PATENT DOCUMENTS

| | | | |
|---|---|---|---|
| 3,749,837 | 7/1973 | Doughty | 179/1 J |
| 3,816,664 | 6/1974 | Koch | 179/15.55 T |
| 4,121,058 | 10/1978 | Jusko et al. | 179/1 J |
| 4,186,643 | 2/1980 | Nishibe et al. | 179/1 J |

*Primary Examiner*—Emanuel S. Kemeny

*Attorney, Agent, or Firm*—Orville N. Greene

[57] ABSTRACT

Chorus effect for an original audio signal is developed by forming a complementary pair of signals from the original. The original signal is stored at a write rate ($f_c$), then, after a delay, strobed to a pair of FIFO registers, one strobe at a higher rate ($f_c+\Delta f$), the other strobe at a lower rate ($f_c-\Delta f$), respectively. The faster readout will decrease the delay (to zero, causing foldover glitch), the slower readout will increase the delay (to excess delay, causing discrete echo). The strobe frequencies are reversed between FIFO registers whenever the delay becomes too great or too small.

11 Claims, 9 Drawing Figures

METHOD AND APPARATUS FOR PRODUCING TWO COMPLEMENTARY PITCH SIGNALS WITHOUT GLITCH

This application is a continuation-in-part of Ser. No. 097,266, filed Nov. 26, 1979, now abandoned.

BACKGROUND OF THE INVENTION

The present invention relates to a method and apparatus for processing audio signals to produce two delayed, complementary pitch signals to produce chorus and other special effects.

When doubling audio signals or producing the effect known as "automatic double tracking", it is usually advantageous to have signals available which vary in terms of pitch as well as delay since this simulates the natural occurrence more effectively. For example, the effect known as "vibrato" is usually considered more desirable than the effect known as "tremolo" because, although both involve variations in the signal volume, "vibrato" also involves a variation in pitch.

Various signal processors have been proposed for changing the pitch of a recorded tape, for example, after or during the time that the tape is being replayed at a faster or slower speed so as to fit the recorded message into a particular length of time slot. Generally, when a given amount of information on a tape is compressed, certain portions of the original wave form (or the digital equivalent thereof) are discarded in order to attain the original (normal) pitch, whereas when such information is expanded, certain portions of the wave form are repeated in order to attain the original pitch. Devices for attaining such results are disclosed, for example, in the following U.S. Pat. Nos. 3,104,284; 3,816,664; 3,949,175 and 4,121,058. Such patents generally recognize the undesirable effects such as "glitches" which result from chopping of the waves and seek to deal with them. The present invention is not suitable for compressing or expanding a sound wave although it employs much of the digital type of equipment required for said prior patents. Thus, the technique of converting an analog signal to a digital signal, storing the digital signal in a delaying device, recovering the stored signal at uniform but different rate than the rate at which it was stored and converting the recovered digital signals back to an analog signal, is generally practiced in said patents.

U.S. Pat. No. 3,749,837 discloses a process of creating enhanced musical effects such as a chorus or Leslie effect with a similar type of apparatus by varying the time delay of the samples stored in the delay device. FIG. 2 of the patent employs two shift registers (delay devices), two clocks (one for each register) and a modulator fed directly to one clock and inverted and fed to the other clock so that the passage of the sampled values is speeded up through one delay register and slowed down through the other. The resultant outputs of the registers are combined to derive the final output. The frequency of the modulator is 3 to 12 Hz, whereas the frequencies of the clocks are 22 KHz. That clock associated with each shift register controls the sampling, input, shifting and output of the shift register.

Among the objects of the invention is to provide an improved apparatus for producing a chorus or Leslie effect. This and other objects of the present invention are achieved by providing apparatus comprising:

(A) sampling means for sampling said input signal at a sampling rate fc and for generating a respective digital signal representative of each successive said sample;

(B) memory means for storing said digital signals as they are generated by said sampling means, said memory means being capable of storing a plurality of said digital signals;

(C) signal removal means for:

(1) removing said digital signals from said memory at a first rate which switches between an increased frequency fi>fc and a decreased frequency fd<fc and generating a first analog signal as a function thereof, said first analog signal being substantially identical in shape to said input signal but being delayed with respect thereto and having a frequency which is different therefrom;

and (2) removing said digital signals from said memory at a second rate which switches between said increased frequency fi>fc and said decreased frequency fd<fc and generating a second analog signal as a function thereof, said second analog signal being substantially identical in shape to said input signal but being delayed with respect thereto and having a frequency which is different therefrom; said first and second rates always being different such that one of said rates is at said increased frequency fi whenever the other of said rates is at said decreased frequency fd;

(D) said signal removal means including delay limiting means for causing the frequency of said first and second rates to switch whenever the delay of either of said analog signals with respect to said input signal exceeds predetermined limits; and (E) means for combining said first and second analog signals to form an audio frequency output signal having a desired tone effect.

As a result of this apparatus, and the method carried out thereby, the present invention insures that the rate at which information is read out of the memory is maintained within predetermined limits so that both analog signals are phase continuous and devoid of glitches. Accordingly, the present invention makes it possible to produce the desired chorus, tremolo and other effects without the drawbacks of the prior art devices.

BRIEF DESCRIPTION OF THE DRAWINGS

For the purpose of illustrating the invention, there is shown in the drawings an embodiment which is presently preferred, it being understood, however, that the invention is not limited to the precise arrangements and instrumentalities shown.

DETAILED DESCRIPTION OF THE PREFERRED EMBODIMENT

Figure 1:
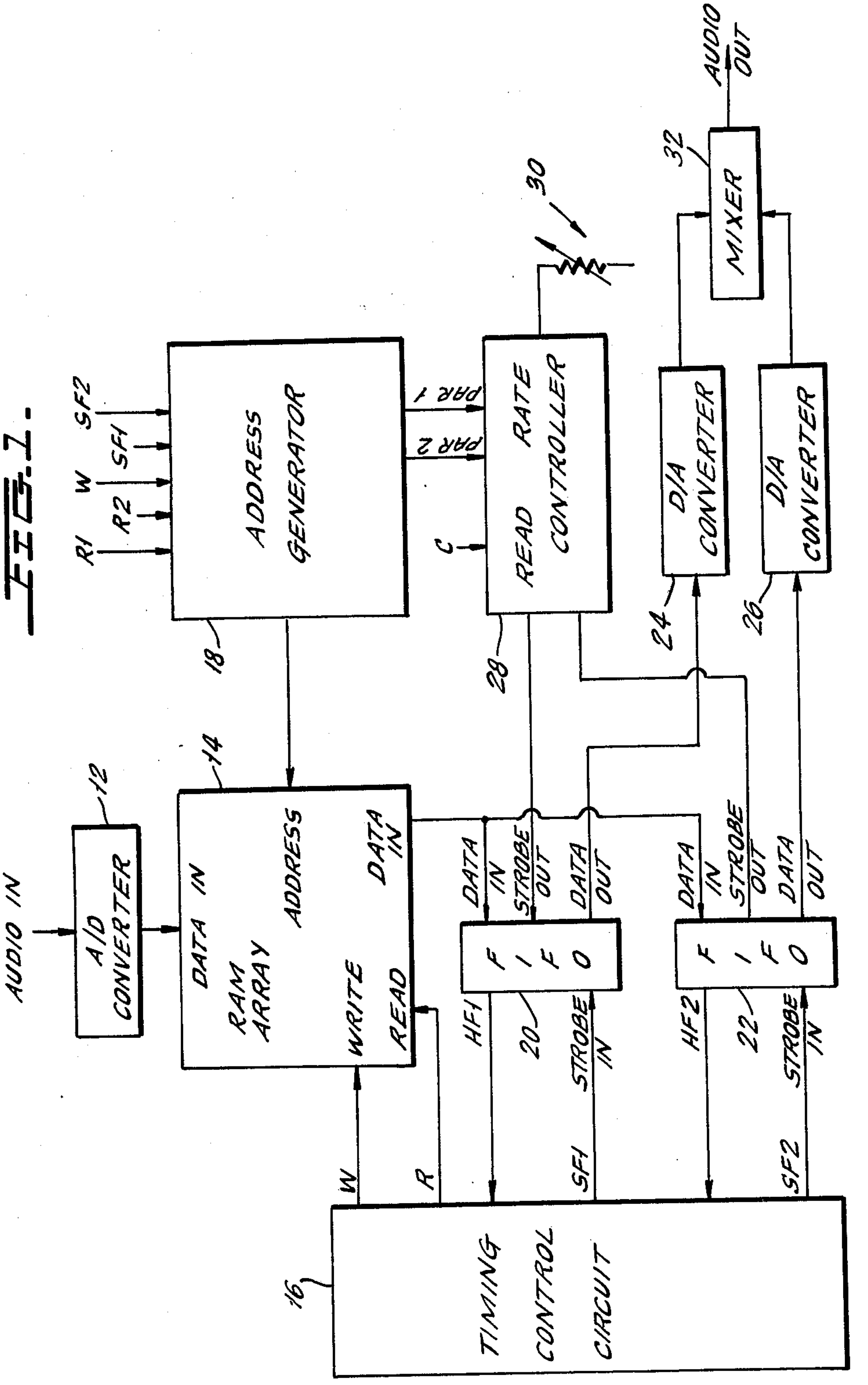
FIG. 1 is a block diagram of a pitch changing circuit constructed in accordance with the principles of the present invention.

Referring now to the drawings wherein like numerals indicate like elements, there is shown in FIG. 1 a block diagram of a pitch modifying circuit constructed in accordance with the principles of the present invention and designated generally as 10.

Pitch modifying circuit 10 includes an A/D converter 12 which samples an analog audio input signal at a sampling rate fc and applies the resultant sampled signals (in digital form) to the DATA IN input of RAM array 14. The sampling rate fc is preferably at least twice the frequency of the highest audio frequency to be recorded. By way of example, the sampling rate fc will be about 40 KHz for full band width audio signals and about 12 KHz for speech signals.

The sampled signals generated by A/D converter 12 are stored in sequentially decreasing address locations of RAM array 14 under the control of a timing control circuit 16 and an address generator 18. Timing control circuit 16 internally generates a clock signal C (see FIG. 2) having a frequency fc and defining a plurality of sampling intervals T. During each sampling interval T, timing control circuit 16 generates a single write pulse W which is applied to the WRITE input of RAM array 14. As a result, a new sampled signal is stored in RAM array 14 during each sampling interval. The storage location in which each sampled signal is stored is determined by address generator 18. In a manner described in greater detail with reference to FIG. 4 below, address generator 18 generates a base address signal which decreases by one during each consecutive sampling interval T. This signal determines the storage location of each consecutive sampled signal applied to RAM array 14. As a result, the first sample signal applied to RAM array 14 will be stored in the last storage location of RAM array 14, the second sample signal will be applied in the next to last storage location of RAM array 14, etc. This process is repeated until all of the storage locations of RAM array 14 are filled at which time the sampled signal stored in the last storage location of RAM array 14 will be replaced by the most recently sampled signal. While the preferred size of RAM array 14 may vary in accordance with the desired application, it is preferred that the RAM array 14 contain a sufficient number of storage locations to store at least 30 milliseconds of data collected at the sampling rate of converter 12.

The data stored in RAM array 14 is applied to a pair of first-in, first-out (FIFO) memories 20, 22 under the control of timing control circuit 16. FIFO memories 20, 22 are asynchronous memories which can be written into and read out of simultaneously. As such, FIFO memories 20, 22 operate as temporary storage buffers between RAM array 14 and D/A converters 24, 26, respectively. As will be shown below, each FIFO memory 20, 22 will store a plurality of sampled signals corresponding to a respective segment of the waveform stored in RAM array 14. These signals are applied to respective D/A converters 24, 26 wherein they are converted to analog signals and combined in a Mixer 32.

Figure 6:
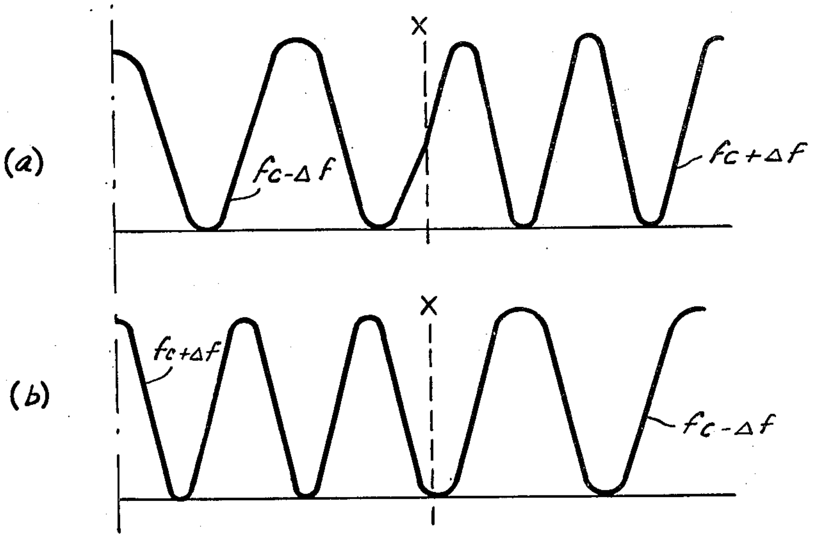
FIGS. 6(*a*) and (*b*) illustrate the wave shapes of analog signals appearing at the output of the D/A converters of FIG. 1.

The sampled signals stored in FIFO memories 20, 22 are removed from memories 20, 22 and applied to D/A converters 24, 26, respectively, under the control of a read rate controller 28. Read rate controller 28 generates a series of strobe pulses SO1 and SO2 which are applied to the respective STROBE OUT inputs of FIFO memories 20, 22 as respective pulse trains. The frequency of each pulse train periodically switches between an increased sampling frequency $fc+\Delta f$ and a decreased sampling frequency $fc-\Delta f$. At any given instant, one of the pulse trains (e.g., the pulse train comprising strobe signal SO1) will be generated at the increased sampling frequency $fc+\Delta f$, while the remaining pulse train (e.g., the pulse train comprising strobe signals SO2) will be generated at the decreased sampling frequency $fc-\Delta f$. Once certain limits are reached (these limits are discussed below), the frequency of the two pulse trains reverses. The magnitude of the frequency deviation $\Delta f$ is preferably controlled by the setting of a potentiometer 30 whose position may be controlled by the operator of tone modifying circuit 10. Since the signal segments stored in FIFO memories 20, 22 are identical in shape to the shape of the input audio signals but are applied to D/A converters 24, 26 at frequencies which vary from the sampling frequency fc at which sampled signals are generated by A/D converter 12, the outputs of the D/A converters 24, 26 will be analog signals which are substantially identical in shape to the audio input signal but will be frequency and phase shifted (time delayed) with respect thereto. See FIGS. 6(*a*) and (*b*) which represent the output of D/A converters 24, 26, respectively. It is assumed in this figure that the frequency of pulse trains SO1, SO2 reversed at time X.

The analog signals appearing at the output of converters 24, 26 are applied to a mixer 32 which generates a resultant audio frequency output signal. By varying the position of potentiometer 30, the operator of control circuit 10 can vary the frequency difference between the two signals appearing at the outputs of converters 24, 26 and thereby control the tone effect of the audio output signal.

While the frequency at which information is read out of FIFO memories 20, 22 is controlled by read rate controller 28, the frequency at which new information is transferred from RAM array 14 into FIFO memories 20, 22 is controlled by timing control circuit 16. Particularly, timing control circuit 16 will vary the rate in which information is transferred from RAM array 14 into FIFO memories 20, 22 in a manner which will maintain both FIFO memories approximately half-full. As a result, FIFO memories 20, 22 will each include a plurality of sequentially sampled signals corresponding to a respective segment of the audio input signal stored in RAM array 18.

To this end, each FIFO memory 20, 22 preferably includes a half-full output HF which indicates whether the contents of the FIFO memory is half-full. One commercially available device having such an output is sold by ADVANCED MICRO DEVICES under the product designation No. 2813. This device generates a binary "1" on its half-full output HF whenever it is less than half-full and generates a binary "0" on its half-full output whenever it is more than half-full. Timing control circuit 16 monitors the condition of the half-full outputs of FIFO memories 20, 22 and causes new information to be read into each FIFO memory as a function of the condition of these outputs.

Figure 2:
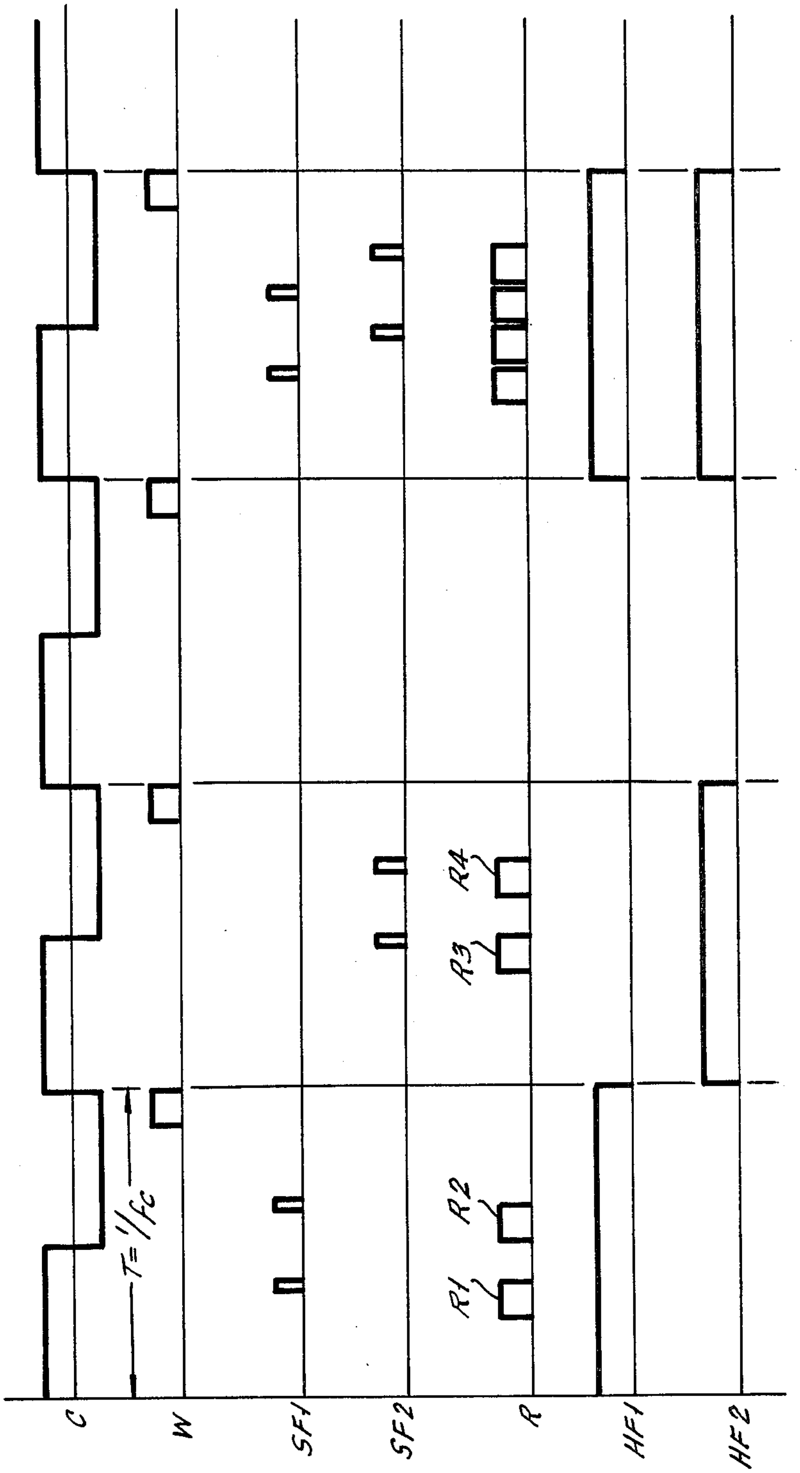
FIG. 2 is a timing diagram illustrating various signals generated by the circuit of FIG. 1.

The interaction between FIFO memories 20, 22 and timing control circuit 16 may best be understood with reference to FIG. 2. In the example illustrated in FIG. 3, it is assumed that FIFO memory 20 is less than half-full and FIFO memory 22 is more than half-full during the first sampling interval T. As a result, only the half-full output HF1 of FIFO memory 20 is at the binary "1" level. This condition is detected by timing control circuit 16 which, in cooperation with the address generator 18, causes a pair of sampled signals located in successive storage locations of RAM array 14 to be applied to FIFO memory 20. To this end, timing control circuit 16 generates a pair of read pulses R and a pair of strobe pulses SF1 during the first sampling interval T. Each read pulse R is applied to the read input of RAM array 14 and causes a sampled signal stored in RAM array 14 to be applied to the DATA OUT output of the array 14. Each strobe pulse SF1 is applied to the strobe in input of FIFO memory 20 and causes the sampled signal appearing at the DATA OUT output of RAM array 14 to be written into the FIFO memory 20.

The sampled signals written into FIFO memory 20 must be applied to FIFO memory 20 in the same order that they were applied to RAM array 14. To this end, address generator 18 includes a pointer address register 62 (see FIG. 4) which cooperates with a base address register 50 to keep track of the storage location of the last sampled signal stored in FIFO memory 20. For example, if FIFO memory 20 contains 10 sampled signals corresponding to address locations 50-60 of RAM array 14, pointer address register 62 will store information indicating that the last sampled signal stored in FIFO memory 20 corresponds to address location 50 of RAM array 14 and address generator 18 will sequentially apply addresses 49 and 48 to the ADDRESS input of RAM array 14 during the first sampling interval T at instants corresponding to the duration of the read signals R1, R2 (see FIG. 2). As a result, the sampled signals located in address locations 49 and 48 of RAM array 14 will be sequentially written into FIFO memory 20 during the sampling interval T.

Again referring to FIG. 2, it is assumed that FIFO memory 20 is more than half-full and that FIFO memory 22 is less than half-full during the second sampling interval T. As a result, only the half-full output HF2 of FIFO memory 20 is at the binary "1" level. This condition is detected by timing control circuit 16 which causes a pair of sampled signals located in successive storage locations in RAM array 14 to be applied to the FIFO memory 22. To this end, timing control circuit 16 again generates a pair of read pulses R and a pair of strobe pulses SF2 during the second sampling interval T. Each read pulse R is applied to the READ input of RAM array 14 and causes a sampled signal stored in the RAM array 14 to be applied to the DATA OUT output of array 14.

Since the sampled signals stored in FIFO memory 22 must be stored in memory 22 in the same sequence that they were applied to RAM array 14, address generator 18 also includes a pointer address register 64 which, together with the base address register 50, keeps track of the address location of the last sampled signal stored in FIFO memory 22. Assuming that FIFO memory 22 contains sampled signals corresponding to address locations 225–235 of RAM array 14, address generator 18 will generate address signals corresponding to the 224 and 223 address location of RAM array 14 during the intervals in which the read signals R3 and R4, respectively, are generated. As a result, the sampled signals corresponding to the 224 and 223 storage locations of RAM array 14 will be written into FIFO memory 22.

In the example illustrated, it is assumed that both FIFO memories 20, 22 are more than half-full during the third sampling interval T. As a result, the half-full outputs HF1 and HF2 of memories 20, 22 will both be at the binary "0" level and timing control circuit 16 will not generate any read or strobe pulses. Accordingly, no additional information will be written into FIFO memories 20, 22 during the sampling interval.

Finally, in the fourth sampling interval T, it is assumed that both FIFO memories 20, 22 are less than half-full. As a result, timing control circuit 16 generates four successive read pulses R and the corresponding strobe pulses SF1, SF2 during the fourth sampling interval. Concurrently, address generator 18 generates the appropriate address signals to assure that the proper sampled signals are written to the FIFO memories 20, 22.

As shown in FIG. 2, the sampled signals stored in RAM array 14 are always transferred to FIFO memories 20, 22 in pairs (i.e., two sampled signals are transferred into a given memory 20, 22 during each sampling interval in which a transfer takes place). The reason for this procedure is explained in connection with the discussion of address generator 18 below.

As made clear by the foregoing, timing control circuit 16 causes information to be transferred from RAM array 14 to FIFO memories 20, 22 as a function of the contents of these memories. Particularly, timing control circuit 16 will cause information to be transferred from RAM array 14 to the FIFO memories 20, 22 only when the particular memory is less than half-full. Since the number of sampled signals stored in FIFO memories 20, 22 is reduced at a rate determined by the strobe signals SO1 and SO2 generated by read rate controller 28, it can be seen that the rate at which sample signals are transferred from RAM array 14 to FIFO memories 20, 22 is actually controlled by the frequency of the strobe signals SO1, SO2.

As noted above, FIFO memories 20, 22 operate as asynchronous buffers temporarily storing data transferred between RAM array 14 and D/A converters 24, 26. At any given instant, the sampled signals stored in FIFO memories 20, 22 will correspond to different signal segments of the signal stored in RAM array 14. In each case, the signal segments stored in FIFO memories 20, 22 represents a delayed portion of the signal stored in RAM array 14.

Assuming that read rate controller 28 generates the strobe signals SO1 at the reduced frequency $fc-\Delta f$, information will be written into FIFO memory 20 at a slower rate than it is written into RAM array 14. As a result, signal segments stored in FIFO memory 20 will represent a continually delayed portion of the stored signal. As time goes on, this delay may become too great and would be recognized as a discreet echo in the audio output signal. In contrast, if the strobe signals SO2 applied to FIFO memory 22 are generated at the increased frequency $fc+\Delta f$ at signal segments stored in FIFO memory 22 will represent a continuously decreased delay. At some point, the delay will become zero and the information in FIFO memory 22 will "fold over" so that sampled signals corresponding to the most recent sample signal will be stored in FIFO memory 22 adjacent the most delayed sample signal stored in the array. This jump in signal segments produces a "glitch" in the audio output signal.

In order to prevent the foregoing problems, the read rate controller 28 of the present invention includes circuitry for monitoring the delay of the signal segments stored in FIFO memories 20, 22 and causing the frequency of strobe pulses SO1, SO2 to reverse whenever the delay becomes too great or to small. Thus, if the strobe signals SO1 are initially greater at the increased rate fc+Δf, and the strobe signals SO2 are initially generated at the decreased rate fc−Δf, the frequency of these signals will be reversed as soon as the delay in either FIFO memory 20, 22 becomes too great or too small.

Having explained the general operation of pitch modifying circuit 10, the specific structure and operation of timing control circuit 16, address generator 18 and read rate controller 28 will now be described.

Figure 3:
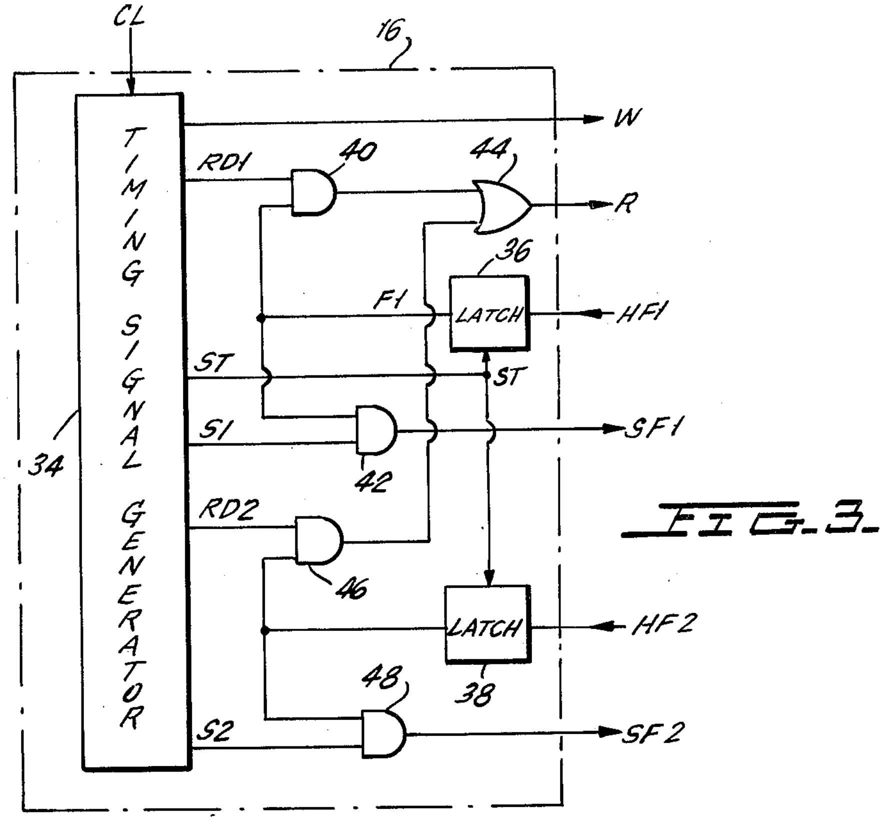
FIG. 3 is a logic diagram illustrating the structure of the timing control circuit of FIG. 1.

The preferred structure of timing control circuit 16 is illustrated in FIG. 3. As shown therein, timing control circuit 16 includes a timing signal generator 34 which generates basic timing signals W, RD1, RD2, ST, S1 and S2 (see FIG. 5) responsive to a high frequency clock signal CL. The clock signal CL may be generated by a high-frequency oscillator (not shown) such as a 555 timer. Timing signal generator 34 may be a simple timing PROM or may be formed using appropriate counters and gates to insure the sequential generation of the timing pulses illustrated in FIG. 5. As shown therein, each sampling interval T is preferably divided into eight equal segments Δt1−Δt8. The write signal W is generated during the last segment Δt8 of each sampling interval T. The read signals RD1 are generated during the segments Δt3 and Δt6 of each sampling interval T and define the time intervals during which sampled signals may be read out of RAM array 14 and applied to FIFO memory 20. The strobe pulses S1 are generated at the end of the segments Δt3 and Δt6 of each sampling interval T and define the strobe instants at which new information can be written in to FIFO memory 20. The read signals RD2 are generated during the segments Δt4 and Δt7 of each sampling interval and define the time intervals during which sampled signals may be read out of RAM array 14 and applied to the FIFO memory 22. The strobe signals S2 are generated at the end of segments Δt4 and Δt7 of each sampling interval and define the instants at which new information may be strobed into FIFO memory 22. Finally, the strobe signal St is generated during the first segment Δt1 of each sampling interval T and serves as a latch signal for latching the condition of the half-full output of FIFO memories 20, 22 at the beginning of each sampling interval.

As noted above, timing control circuit 16 causes sampled signals located in RAM array 14 to be applied to the FIFO memories 20, 22 only when the FIFO memory requests additional data. FIFO memories 20, 22 so request data when they generate a binary "1" on their half-full outputs. Timing control circuit 16 monitors the condition of the half-full outputs of FIFO memories 20, 22 and generates the read signal R and the strobe signals SF1 and SF2 accordingly. To this end, timing control circuit 16 includes a latch circuit 36 connected to the half-full output HF1 of FIFO memory 20 and a latch circuit 38 connected to the half-full output HF2 of FIFO memory 22. The condition of the half-full output of FIFO memories 20, 22 is latched into latch circuits 36, 38 at the beginning of each sampling interval T by the strobe signal St generated by timing signal generator 34. If the half-full output of FIFO memory 20 is at the binary "1" level at the beginning of a given sampling interval (indicating that FIFO memory 20 is requesting additional information), the output of latch 36 latches at the binary "1" level.

In this condition, latch circuit 36 enables AND gates 40, 42 causing them to pass read pulses RD1 and strobe pulses S1, respectively. The read pulses RD1 are applied to OR gate 44 whose output defines the read pulses R applied to the READ input of RAM array 14. The output of AND gate 42 defines the strobe signals SF1 applied to the STROBE IN input of FIFO memory 20. As a result, timing control circuit 16 causes a pair of sampled signals stored in RAM array 14 to be written into FIFO memory 20 during each sampling interval in which additional data has been requested by FIFO memory 20. In the event that the half-full output HF1 of FIFO memory 20 is at the binary "0" level at the beginning of the sampling interval, the output of latch circuit 36 will be latched at the binary "0" level disabling AND gates 40, 42. In such a case, no additional data will be read into FIFO memory 20 during that sampling interval. In a similar manner, the output of latch circuit 38 controls the operation of AND gates 46, 48 to insure that a pair of sample signals are written into FIFO memory 22 only when requested by FIFO memory 22.

Figure 4:
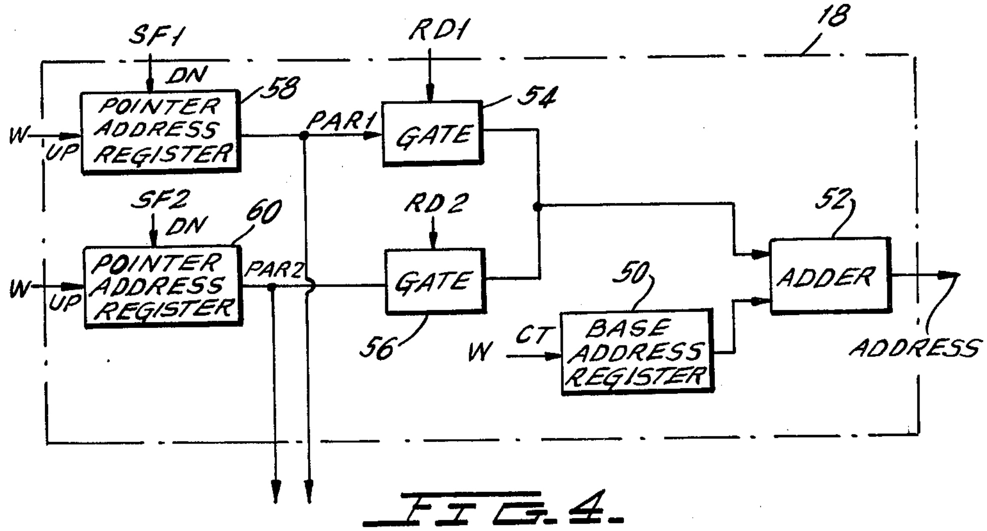
FIG. 4 is a block diagram illustrating the structure of the address generator of FIG. 1.

Turning now to FIG. 4, the structure and operation of address generator 18 will be described. The heart of address generator 18 is a base address register 50 which determines the storage location of each successive sample signal generated by A/D converter 12. Base address register 50 is preferably a down counter whose output decreases by one each time a new write pulse W is applied to its count input CT. As a result, the base address decreases by one during each sampling interval T causing each successive sampled signal to be stored in a successively decreasing storage location of RAM array 14.

Figure 5:
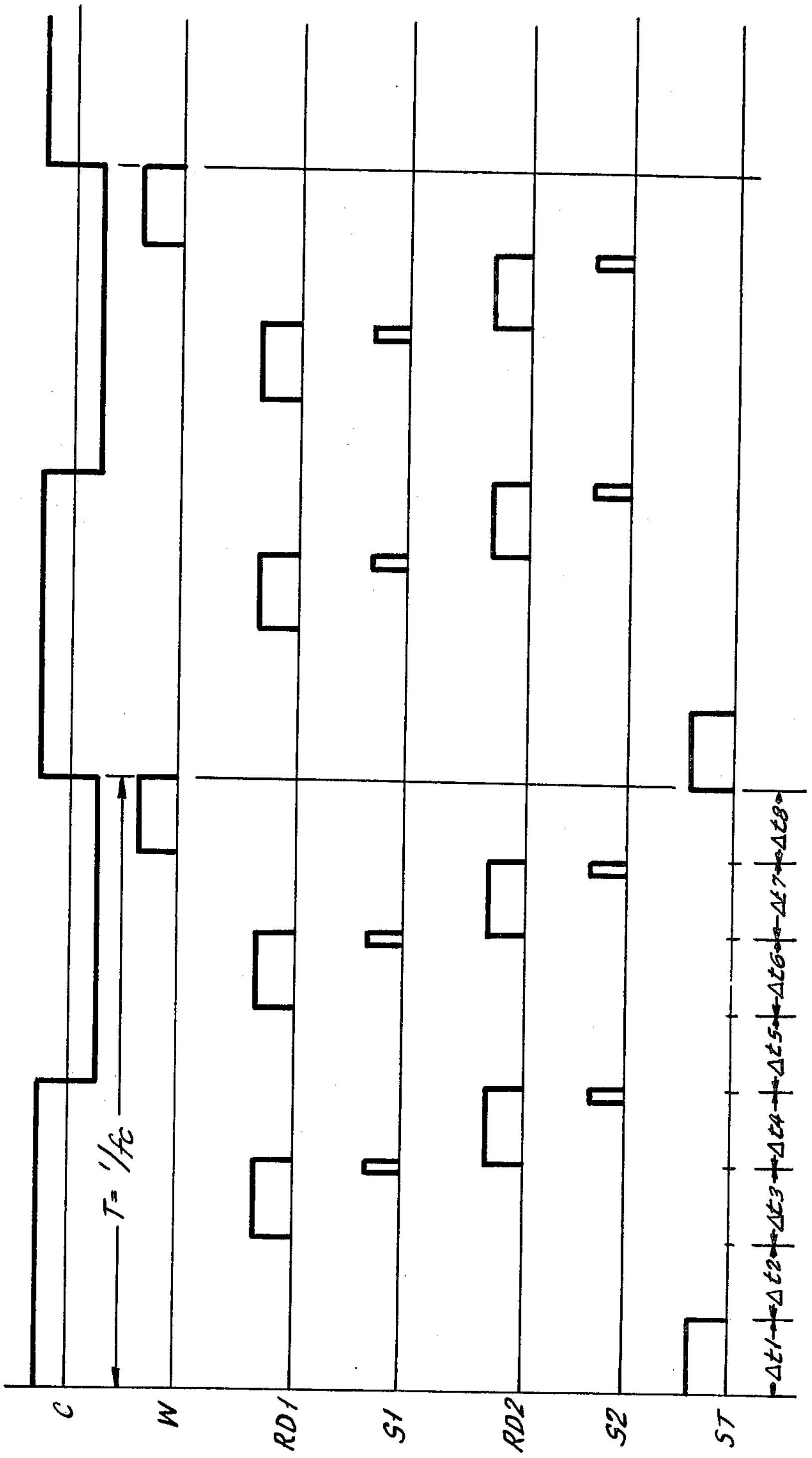
FIG. 5 is a timing diagram illustrating various signals generated within the timing control circuit of FIG. 3.

The output of base address register 50 is applied to an adder 52 whose output is applied to the ADDRESS input of RAM array 14. The remaining input of adder 52 is coupled to the outputs of gates 54, 56 which are gated by read pulses RD1, RD2, respectively. As shown in FIG. 5, the read pulses RD1, RD2 are generated prior to the generation of the write pulse W. As a result, the output of adder 52 will be equal to the base address register whenever a write pulse W is applied to the WRITE input of RAM array 14. Accordingly, each successive sampled signal generated by A/D converter 12 will be written into RAM array 14 at the address location determined by base address register 50.

As noted above, address generator 18 must include means for determining the storage location in RAM array 14 corresponding to the last sampled signals applied to FIFO memories 20, 22. To this end, address generator 18 includes a pair of pointer registers 58, 60 which are associated with FIFO memories 20, 22, respectively. Pointer register 58 is preferably an up-down counter whose stored count (and, therefore, whose output) is increased by one each time it receives a write pulse W on its UP input and whose stored count (and, therefore, whose output) is decreased by one each time a strobe pulse SF1 is applied to its down input DN. Pointer register 60 is preferably an up-down counter whose stored count (and, therefore, whose output) is increased by one each time it receives a write pulse W on its UP input and whose stored count (and, therefore, whose output) is decreased by one each time a strobe pulse SF2 is applied to its down input DN. As noted above, the strobe signals SF1, SF2 are generated in pairs. During those time intervals in which the FIFO memory 20 requests additional data, timing control circuit 16 generates a pair of strobe signals SF1. Similarly, during those time intervals in which the FIFO memory 22 requests additional data, timing control circuit 16 generates a pair of strobe signals SF2. During those time intervals in which FIFO memories 20, 22 do not request additional information, timing control circuit 16 does not generate any corresponding strobe pulses SF1, SF2. As a result, the net count in pointer address register 58 will increase by one during each sampling interval T in which additional information is not applied to FIFO memory 20 and will decrease by one during each sampling interval during which additional information is applied to FIFO memory 20. Similarly, the net count in pointer address register 60 will decrease by one during one each sampling interval in which additional information is not applied to FIFO memory 22 and will decrease by one during each sampling interval during which additional information is applied to FIFO memory 22. The importance of reading pairs of sampled signals into FIFO memories 20, 22 can now be explained.

Assuming that FIFO memory 20 does not request additional data during a given sampling interval T, the stored count in pointer address register 58 will increase by one. It would appear that this would result in an error since the storage location of the last sampled signal stored in FIFO memory 20 has not changed. It must be remembered, however, that the count in base address register 50 decreases by one during each successive sampling interval. As such, the count in pointer address register 58 must increase by one to insure that the address appearing at the output of adder 52 during the portion of the sampling interval corresponding to the generation of the read pulse RDL will be the same in two consecutive sampling intervals. If the count in pointer address register 58 did not change during those sampling intervals in which no additional information is applied to FIFO memory 20, the address generated by adder 52 during that portion of the sampling interval corresponding to the generation of the read pulse RD1 would be one less than the address generated during the previous sampling interval which would produce an improper result.

Figure 7:
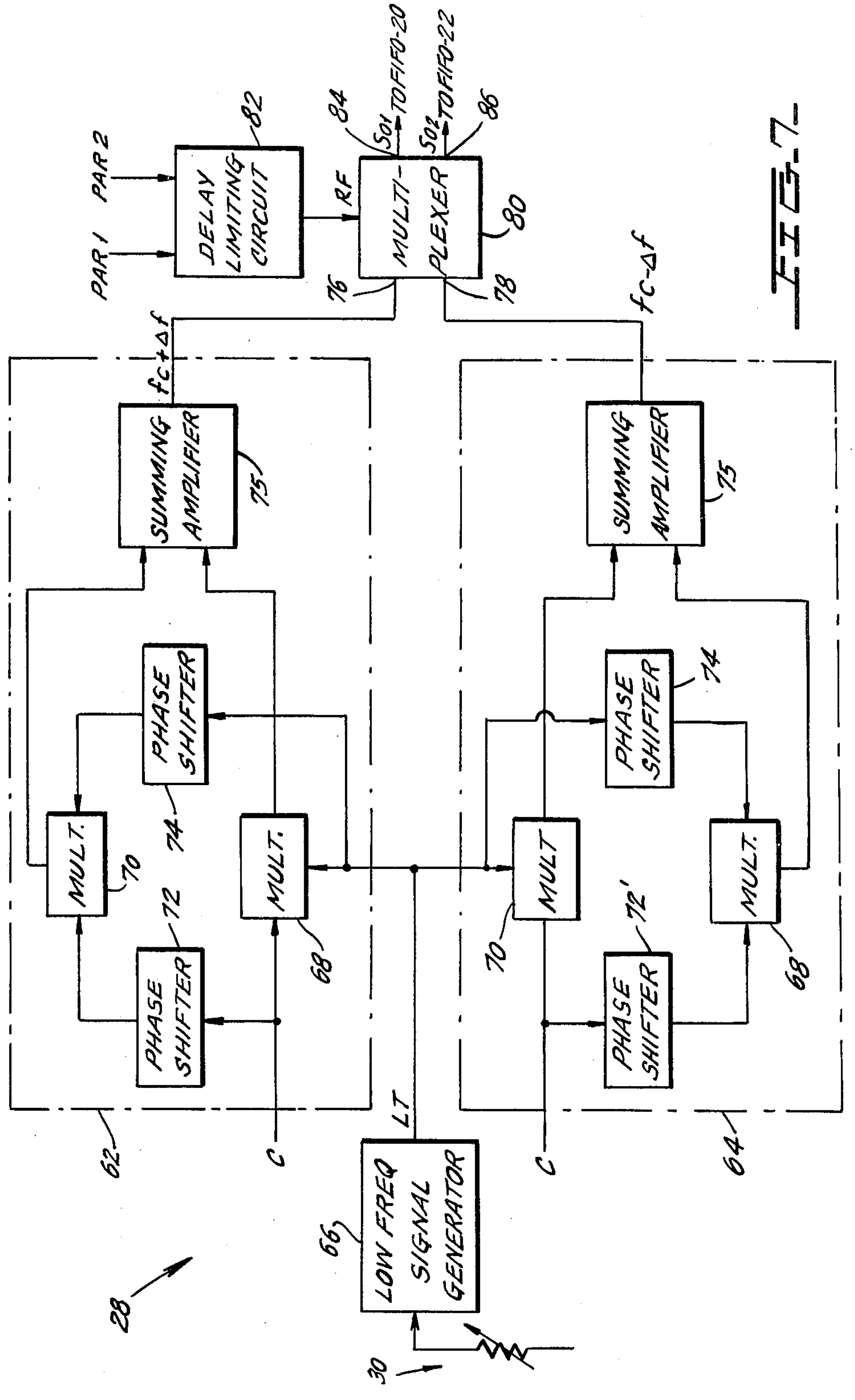
FIG. 7 is a block diagram of the read rate controller of FIG. 1.

Referring now to FIG. 7, the structure and operation of read rate controller 28 will be described. Read rate controller 28 includes a pair of single side and balanced modulators 62, 64 which generate output pulse trains $fc+\Delta f$ and $fc-\Delta f$, respectively. Each modulator modulates the basic clock signal C generated by timing control circuit 16 with a low-frequency signal LT generated by a low-frequency generator 66. The frequency of the signal LT generated by the frequency generator 66 is determined by the setting of the potentiometer 30 and defines the magnitude of the frequency variation $\Delta f$. Since the two balanced modulators 62, 64 receive the same modulated signal C and modulating signal LT, the two pulse trains generated thereby will remain highly in step, each varying precisely around the base frequency fc. This is highly desirable since it insures the accurate operation of pitch changing circuit 10.

As shown in FIG. 7, modulator 62 includes a pair of signal multipliers 68, 70 and a pair of +90° phase shifters 72, 74. Multiplier 68 receives the base signal C and the low-frequency signal LT and applies the resultant product to one input of summing amplifier 75. Multiplier 70 also receives the base signal C and low-frequency signal LT after they have passed through phase shifters 72, 74, respectively. The resultant product is applied to the remaining input terminal summing amplifier 75. In a known manner, the resultant output of summing amplifier 74 will be a pulse train having a frequency $fc+\Delta f$.

The structure and operation of modulator 64 is identical to that of modulator 62 with the exception that the phase shifter 72' is a −90° phase shifter. As a result, the output of the summing amplifier of modulator 64 will be a pulse train having a frequency $fc-\Delta f$.

The outputs of modulator 62, 64 are applied to the inputs 76, 78, respectively, of multiplexer 80. The operation of multiplexer 80 is controlled by a reverse frequency control signal RF generated by delay limiting circuit 82. When the control signal RF is at the binary "1" level, input 76 of multiplexer 80 is coupled to its output 84 and input 74 of multiplexer 80 is coupled to its output 86. Conversely, when control signal RF is at the binary "0" level, input 76 of multiplexer 80 is coupled to output 86 while input 78 of multiplexer 80 is coupled to output 84. Accordingly, the frequency of the pulse trains defined by strobe pulses SO1 and SO2 will switch between the increased and decreased frequency levels $fc+\Delta f$ and $fc-\Delta f$ as a function of the control signal RF. The condition of the control signal RF will change whenever the delay in FIFO memories 20, 22 increases or decreases beyond predetermined limits.

Figure 8:
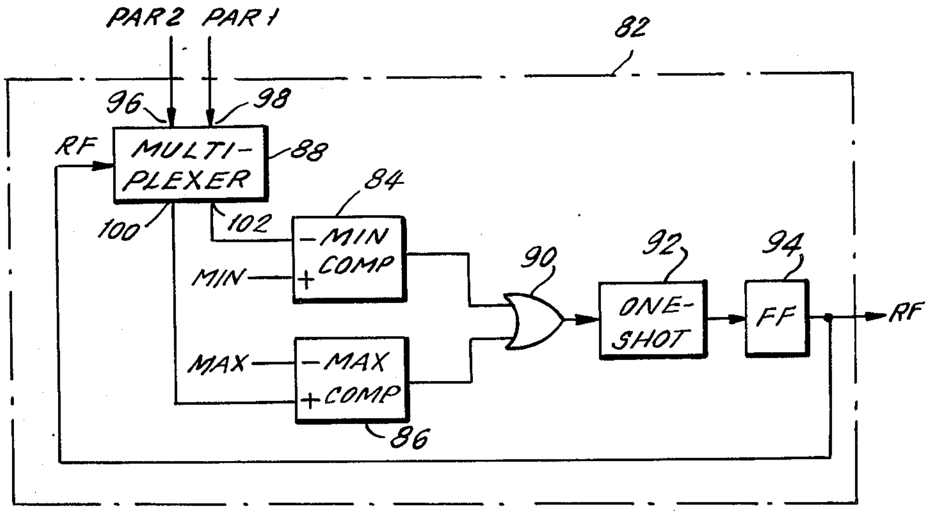
FIG. 8 is a block diagram of the delay limiting circuit of FIG. 7.

The structure of delay limiting circuit 82 is illustrated in FIG. 8. As shown therein, delay limiting circuit 82 includes a pair of comparators 84, 86 whose negative and positive inputs, respectively, are coupled to the outputs 102, 100 of multiplexer 88. Minimum comparator 84 is connected by multiplexer 88 to the output of that pointer address register 58, 60 (see FIG. 4) whose delay is decreasing (i.e., that register whose strobe pulses are being generated at the increased frequency $fc+\Delta f$). Minimum comparator 84 compares the output of this register with a minimum permissible delay signal MIN and generates a binary "1" on its output whenever the count in the decreasing pointer address register falls below this minimum value. The minimum value MIN is preferably set by the operator of circuit 10 by adjusting the position of a potentiometer (not shown).

The maximum comparator 86 is connected to the output of the pointer address register 58, 60 whose delay is increasing (.e., that register whose strobe pulses are being generated at the frequency $fc-\Delta f$). Comparator 86 compares the output of this register with the maximum value MAX and generates a binary "1" on its output whenever the delay in the register has increased beyond the maximum value. The maximum value MAX is preferably set by the operator of circuit 10 by adjusting the position of a potentiometer (not shown).

The output of comparators 84, 86 are applied to respective inputs of an OR gate 90 whose output is coupled to a one-shot 92. Whenever the output of either comparator 84, 86 switches from the binary "0" to the binary "1" level, one-shot 92 will generate a single positive pulse which is applied to flip-flop 94 causing the output of flip-flop 94 to toggle to the opposite logic value. The output of flip-flop 94 defines the reverse frequency control signal RF which is applied to multiplexer 80 (see FIG. 7).

Multiplexer 88 includes a pair of input terminals 96, 98 and a pair of output terminals 100, 102. Inputs 96, 98 are coupled to the outputs of pointer address registers 60, 58, respectively. Outputs 100, 102 are connected to the plus and minus input of comparators 84, 86, respectively. The control signal RF appearing at the output of flip-flop 94 is applied to multiplexer 88 as a control signal. When the signal RF is at the binary "1" level, the input 96 of multiplexer 88 is coupled to its output 100 and its input 98 is coupled to its output 102. Conversely, when the control signal RF is at the binary "0" level, the input 96 of multiplexer 88 is coupled to the output 102 and the input 98 is coupled to the output 100.

As explained with reference to FIG. 7, the condition of the control signal RF determines the frequency of the strobe pulses SO1, SO2. Particularly, when the control signal RF is at the binary "1" level, the strobe pulses SO1 will be at the increased frequency level fc+Δf and the delay in pointer address register 58 will be decreasing. Conversely, the delay in pointer address register 60 will be increasing. Since the control signal RF is at the binary "1" level, the output of pointer address register 58 will be applied to the minimum comparator 84 while the output of the pointer address register 60 will be applied to the maximum comparator 86. Accordingly, minimum comparator 84 looks for a minimum delay in pointer address register 58 while maximum comparator 86 will look for a maximum delay in pointer address register 60. When either of these limits is exceeded, one-shot 92 will generate a pulse causing the output of flip-flop 94 to toggle with the result that the frequency of the strobe signals SO1, SO2 are reversed and the comparators 84, 86 will now compare the outputs of pointer address register 60, 58, respectively, to the minimum and maximum values.

As noted above, delay limiting circuit 82 insures that the time delay between the signals stored in FIFO memories 20, 22 and the signals stored in RAM array 14 are maintained within predetermined limits so as to avoid discreet echoes or glitches in the audio output circuit. In order to insure the best operation of delay limiting circuit 82, the point address registers 58, 60 are preferably preset at a value half-way between the maximum and minimum delay values (determined by the MAX and MIN signals applied to comparators 84, 86) when pitch modifying circuit 10 is first turned out. This can be accomplished by utilizing address registers 58, 60 which can be preloaded with preset numbers upon the application of a load signal thereto. The particular manner for achieving this result is well known in the art and will not be described herein.

As should be clear from the foregoing description of the present invention, the present invention makes it possible to combine two analog signals, each having substantially the same wave shape as the audio input signal but being phase and frequency shifted with respect thereto (and with respect to each other) so as to produce an audio output signal having a desired chorus, vibrato or other effect. By varying the frequency at which the stored signals are read out of FIFO memories 20, 22 between a first frequency f1 greater than the sampling frequency fc and a second frequency f2 less than the sampling frequency fc and reversing these frequencies whenever the delay in either FIFO memory 20, 22 becomes too great or too small, the present invention makes it possible to generate two phase continuous, albeit frequency variable, signals having no discontinuities introduced into either signal. In the foregoing description, the sampling frequency of FIFO memories 20, 22 is switched between an increased frequency fc+Δf and a decreased frequency fc−Δf. More generally, the sampling frequencies may be switched between an increased sampling frequency fi which is greater than the base sampling frequency fc and a decreased sampling frequency fd which is less than the base sampling frequency fc.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for varying the pitch of an audio frequency input signal, comprising:

(A) sampling means for sampling said input signal at a sampling rate fc and for generating a respective digital signal representative of each successive said sample;

(B) memory means for storing said digital signals as they are generated by said sampling means, said memory means being capable of storing a plurality of said digital signals;

(C) signal removal means for:

(1) removing said digital signals from said memory means at a first rate which switches between an increased frequency fi>fc and a decreased frequency fd<fc and generating a first analog signal being substantially identical in shape to said input signal but being delayed with respect thereto and having a frequency which is different therefrom;

and (2) removing said digital signals from said memory means at a second rate which switches between said increased frequency fi>fc and said decreased frequency fd<fc and generating a second analog signal as a function thereof, said second analog signal being substantially identical in shape to said input signal but being delayed with respect thereto and having a frequency which is different therefrom; said first and second rates always being different such that one of said rates is at said increased frequency fi whenever the other of said rates is at said decreased frequency fd;

(D) said signal removal means including delay limiting means for causing the frequency of said first and second rates to switch whenever the delay of either of said analog signals with respect to said input signal exceeds pretermined limits; and (E) means for combining said first and second analog signals to form an audio frequency output signal having a desired tone effect.

2. Apparatus in accordance with claim 1, wherein said increased frequency fi=fc+Δf and said decreased frequency fd=fc−Δf.

3. Apparatus in accordance with claim 2, wherein said signal removal means includes first and second signal side band balanced modulators for generating first and second pulse trains, respectively, said first pulse train having said increased frequency fi, said second pulse train having said decreased frequency fd, said signal removing means using said first and second pulse trains to remove said digital signals from said memory means at said first and second rates.

4. Apparatus in accordance with claim 1, wherein said memory means comprises:

(A) random access memory means for storing said digital signals as they are generated by said sampling means;

(B) first and second FIFO memory means; and (C) means for transferring said digital signals stored in said RAM memory means into said first and second FIFO memory means in the same order that they are generated by said sampling means such that first and second signal segments are stored in said first and second FIFO memory means.

5. Apparatus in accordance with claim 4, wherein the information stored in said first and second FIFO memory means is read out of said first and second FIFO memory means at a frequency determined by first and second strobe pulse trains applied thereto and wherein said signal removal means comprises:

(A) means for generating a first pulse train having a frequency fi;

(B) means for generating a second pulse train having a frequency fd; and (C) multiplexer means operable in a first mode wherein said multiplexer means applies said first and second pulse trains to said first and second FIFO memory means as said first and second strobe pulse trains, respectively, and a second mode wherein said multiplexer applies said first and second pulse trains to said second and first FIFO memory means as said second and first strobe pulse trains, respectively.

6. Apparatus in accordance with claim 5, wherein said delay limiting means causes said multiplexer means to switch from one of said first and second operating modes to the other of said first and second operating modes whenever the delay of either of said analog signals exceeds said predetermined limits.

7. Apparatus in accordance with claim 6, wherein said delay limiting means includes:

(A) minimum delay comparator means for comparing the delay of the signal segment stored in that one of said first and second FIFO memory means whose delay is decreasing with a minimum preset value and for generating a reversal signal whenever the delay in said one of said FIFO memory means is less than said preset minimum value;

(B) maximum comparator means for comparing the delay of the signal segment stored in that one of said first and second FIFO memory means whose delay is increasing with a predetermined maximum delay and for generating a reversal signal whenever said delay is greater than said maximum value; and (C) means for causing said multiplexer means to switch operating modes in response to the generation of said reversal signal by either said minimum and maximum delay comparators.

8. Apparatus in accordance with claim 7, further including means for adjusting said minimum and maximum levels.

9. Apparatus in accordance with claim 4, wherein said digital signals generated by said sampling means are stored in said random access memory in sequential storage locations of said random access memory and wherein said means for transferring said digital signals stored in said RAM memory means into said first and second FIFO memory means includes means for keeping track of the address location in said RAM memory means of the last digital signal transferred from said RAM memory means to said first FIFO memory means and the address location of the last digital signal transferred from said RAM memory means to said second FIFO memory means.

10. A method for varying the pitch of an audio frequency input signal, comprising the steps of:

(A) sampling said input signal at a sampling rate fc and generating a respective digital signal representative of each successive said sample;

(B) storing said digital signals in a memory as they are generated, said memory being capable of storing a plurality of digital signals;

(C) removing said digital signals from said memory at a first rate which switches between an increased frequency $fi > fc$ and a decreased frequency $fd < fc$ and generating a first analog signal as a function thereof, said first analog signal being substantially identical in shape to said input signal but being delayed with respect thereto and having a frequency which is different therefrom;

and (D) removing said digital signals from said memory at a second rate which switches between said increased frequency $fi > fc$ and said decreased frequency $fd < fc$ and generating a second analog signal as a function thereof, said second analog signal being substantially identical in shape to said input signal but being delayed with respect thereto and having a frequency which is different therefrom; said first and second rates always being different such that one of said rates is at said increased frequency fi when the other of said rates is at the decreased frequency fd;

(F) causing the frequency of said first and second rates to switch whenever the delay of either of said first and second analog signals with respect to said input signal exceeds predetermined limits; and (G) combining said first and second analog signals to form an audio frequency output signal having a desired tone effect.

11. A method in accordance with claim 10, wherein said increased frequency $fi = fc + \Delta f$ and said decreased frequency $fd = fc - \Delta f$.

* * * * *